(12) United States Patent
Roach, III et al.

(10) Patent No.: US 9,909,459 B2
(45) Date of Patent: Mar. 6, 2018

(54) GAS TURBINE ENGINE EXHAUST FLUID PASSAGE DUCT

(71) Applicant: Rolls-Royce Corporation, Indianapolis, IN (US)

(72) Inventors: John M. Roach, III, Indianapolis, IN (US); Jeffrey A. Holmes, Fishers, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 523 days.

(21) Appl. No.: 14/206,798

(22) Filed: Mar. 12, 2014

(65) Prior Publication Data
US 2014/0260325 A1 Sep. 18, 2014

Related U.S. Application Data

(60) Provisional application No. 61/780,893, filed on Mar. 13, 2013.

(51) Int. Cl.
*F01D 25/30* (2006.01)
*F02C 3/14* (2006.01)
*F01D 9/02* (2006.01)

(52) U.S. Cl.
CPC ............ *F01D 25/30* (2013.01); *F01D 9/023* (2013.01); *F02C 3/145* (2013.01); *Y10T 137/0318* (2015.04); *Y10T 137/0536* (2015.04)

(58) Field of Classification Search
CPC ............ F01D 25/30; F02C 3/145; F02C 6/20
See application file for complete search history.

(56) References Cited

U.S. PATENT DOCUMENTS

| | | | | |
|---|---|---|---|---|
| 1,269,998 A | * | 6/1918 | Baumann | F01D 25/30 60/697 |
| 2,796,732 A | * | 6/1957 | Penn | F01D 25/30 60/726 |
| 3,589,132 A | * | 6/1971 | Du Pont | F02K 3/105 60/262 |
| 4,037,409 A | | 7/1977 | Leibach | |
| 4,141,212 A | * | 2/1979 | Koschier | F02C 3/145 60/39.511 |

FOREIGN PATENT DOCUMENTS

| | | | | |
|---|---|---|---|---|
| EP | 2357323 | | 8/2011 | |
| GB | 191503832 A | * | 0/1915 | ............ F01D 25/30 |

(Continued)

OTHER PUBLICATIONS

International Search Report for PCT International Application Serial No. PCT/US2014/024602, completed Jul. 28, 2014.

(Continued)

*Primary Examiner* — Gerald L Sung
*Assistant Examiner* — Rene Ford
(74) *Attorney, Agent, or Firm* — Barnes & Thornburg LLP (57) ABSTRACT

A fluid plenum including a body defining an internal cavity having an inlet and an outlet. The fluid plenum further includes at least one wall positioned in the internal cavity that divides the internal cavity into first and second passageways, and which also divides the inlet into first and second inlet portions, and divides the outlet into first and second outlet portions. The first passageway receives fluid through the first inlet portion and directs fluid to the first outlet portion, and the second passageway receives fluid through the second inlet portion and directs fluid to the second outlet portion. The first and second passageways extend first and second lengths that are different from one another, and also generate a substantially common back-pressure at the first and second inlet portions during flow of a fluid stream through the inlet, including a first sub-stream of the fluid stream through the first passageway and a second sub-stream of the fluid stream through the second passageway.

13 Claims, 11 Drawing Sheets

(56) References Cited

FOREIGN PATENT DOCUMENTS

GB            111153 A   * 11/1917   ............. F01D 25/30
GB            0764064       12/1956

OTHER PUBLICATIONS

D.E. Bergsten, Allison 250 C24D, -C24G Exhaust Collector Experimental Investigation, Allison Gas Turbine Operations of General Motors Corporation Technical Data Report, (AW0001-043), Dec. 1983.
V.V. Frolov and V.M. Golubtsov. Designing Vaneless Nozzle Units for Axial Turbine Stages. Thermal Engineering, 19 (9); 83-86, Sep. 1972.
D.S. Miller, Internal Flow Systems, BHR Group Limited, 1976.
P.T. Ross and R.J. Rathke, Asymmetric Exhaust and Power Integration, Allison Gas Turbine Operations of General Motors Corporation Independent Research and Development Data Sheet, (0704-0111), 1984.
D.J. Helton, Small Axial Turbine Aerodynamics, General Motors Corporation, Detroit Diesel Allison Division, Independent Research and Development Data Sheet, (82-696), 1984.
D.E. Bergsten, Allison 250 C34B Engine Exhaust Collector Experimental Investigation, Allison Gas Turbine Operations of General Motors Corporation Technical Data Report, (AW0001-034), Jun. 1983.
European Office Action, European Application No. 14719431.0-1607, dated Aug. 2, 2017, 4 pages.

* cited by examiner

GAS TURBINE ENGINE EXHAUST FLUID PASSAGE DUCT

CROSS REFERENCE TO RELATED APPLICATIONS

This application claims priority to and the benefit of U.S. Provisional Patent Application No. 61/780,893, filed 13 Mar. 2013, the disclosure of which is now expressly incorporated herein by reference.

BACKGROUND

The disclosure generally relates to a fluid duct in a turbine engine for receiving a fluid stream and directing the fluid stream along a fluid pathway. In an illustrative embodiment, the fluid duct receives combustion gases from a turbine section of a turbine engine at an inlet and directs the combustion gases along a pathway to an outlet.

SUMMARY

While the actual nature of the disclosure covered herein can only be determined with reference to the claims appended hereto, certain forms of the disclosure that are characteristic of the embodiments disclosed herein are described briefly as follows.

In one embodiment of the present disclosure, a fluid plenum is provided including a body defining an internal cavity, an inlet to the internal cavity through the body, and an outlet from the internal cavity through the body, with the outlet spaced from the inlet. The fluid plenum also includes at least one wall disposed in the internal cavity and dividing the internal cavity into at least first and second passageways, with the at least one wall dividing the inlet into at least first and second inlet portions positioned adjacent one another and dividing the outlet into at least first and second outlet portions positioned adjacent one another. The first passageway is structured to receive fluid through the first inlet portion and to direct fluid to the first outlet portion, and the second passageway is structured to receive fluid through the second inlet portion and to direct fluid to a second outlet portion, wherein the first and second passageways extend along first and second lengths with the first and second lengths being different from one another, and wherein the first and second passageways are structured to generate a substantially common back-pressure at the first and second inlet portions during flow of a fluid stream through the inlet, including a first sub-stream of the fluid stream through the first passageway and a second sub-stream of the fluid stream through the second passageway.

In another embodiment of the present disclosure, a method of directing a flow of fluid is provided including the steps of bifurcating an interior of a plenum into at least first and second passageways by positioning a wall in the interior of the plenum, receiving a fluid stream through an inlet of the plenum wherein a first sub-stream of the fluid stream enters a first inlet portion of the inlet and a second sub-stream of the fluid stream enters a second inlet portion of the inlet with the first inlet portion positioned adjacent the second inlet portion, discharging the fluid stream through an outlet of the plenum wherein the first sub-stream of the fluid stream exits through a first outlet portion of the outlet and the second sub-stream of the fluid stream exits through a second outlet portion of the outlet, wherein the first outlet portion positioned adjacent the second outlet portion, wherein the first sub-stream passes through the first passageway between the first inlet portion and the first outlet portion, and wherein the second sub-stream passes through the second passageway between the second inlet portion and the second outlet portion, and shaping at least one of the wall and the plenum such that the first and second fluid passageways have different lengths and such that back-pressure at the inlet is the same at both of the first and second inlet portions.

In yet another embodiment of the present disclosure, a turbine engine is provided including a compressor section structured to compress a fluid, a combustor section disposed downstream of the compressor section to receive compressed fluid from the compressor section and to contain the compressed fluid and fuel during combustion, and a turbine section disposed downstream of the combustor section to receive combustion gases from the combustor section and to convert energy associated with the combustion gases to rotary power at least in part for the compressor section and with the turbine section and the compressor section being rotatable about a common axis. The turbine engine further includes a fluid plenum disposed downstream of the turbine section and including a body defining an internal cavity, an inlet to said internal cavity through said body with the inlet receiving a fluid stream of combustion gases from the turbine section, an outlet from the internal cavity through the body with the outlet spaced from the inlet, and the outlet directed radially outward relative to the common axis. The fluid plenum is disposed downstream of the turbine section and includes at least one wall disposed in the internal cavity and dividing the internal cavity into at least first and second passageways and further dividing the inlet into at least first and second inlet portions positioned adjacent one another and the outlet into at least first and second outlet portions positioned adjacent one another. The first passageway is structured to receive fluid through the first inlet portion and to direct fluid to the first outlet portion. The second passageway is structured to receive fluid through the second inlet portion and to direct fluid to the second outlet portion, with the first and second passageways extending along first and second lengths that are different from one another. The first and second passageways are operable to generate a substantially common back-pressure at the first and second inlet portions during flow of a fluid stream through the inlet, including a first sub-stream of the fluid stream through the first passageway and a second sub-stream of the fluid stream through the second passageway.

Further forms, embodiments, features, aspects, benefits, objects, and advantages will become apparent from the detailed description and figures provided herewith.

DETAILED DESCRIPTION OF THE DRAWINGS

For the purpose of promoting an understanding of the principles of the present disclosure, reference will now be made to the embodiments illustrated in the drawings and specific language will be used to describe the same. It will nevertheless be understood that no limitation of the scope of the disclosure is hereby intended. Any alterations and further modifications in the described embodiments, and any further applications of the principles of the disclosure as described herein are contemplated as would normally occur to one skilled in the art to which the disclosure relates.

The inventor has observed that an exhaust collector guides a vitiated fluid stream, such as a stream of combustion gases exiting the turbine section of a turbine engine, while inducing minimal system-level (engine) loss. Total system-level losses are the result of both direct and indirect losses. Direct losses can result from total pressure loss as the fluid stream passes through the exhaust collector itself. Indirect losses can result from interaction effects between the turbine section and the exhaust collector, and are primarily a function of back-pressure asymmetry induced by the exhaust collector at the turbine exit. Performance metrics therefore include total pressure loss and induced back-pressure asymmetry.

Figure 1:
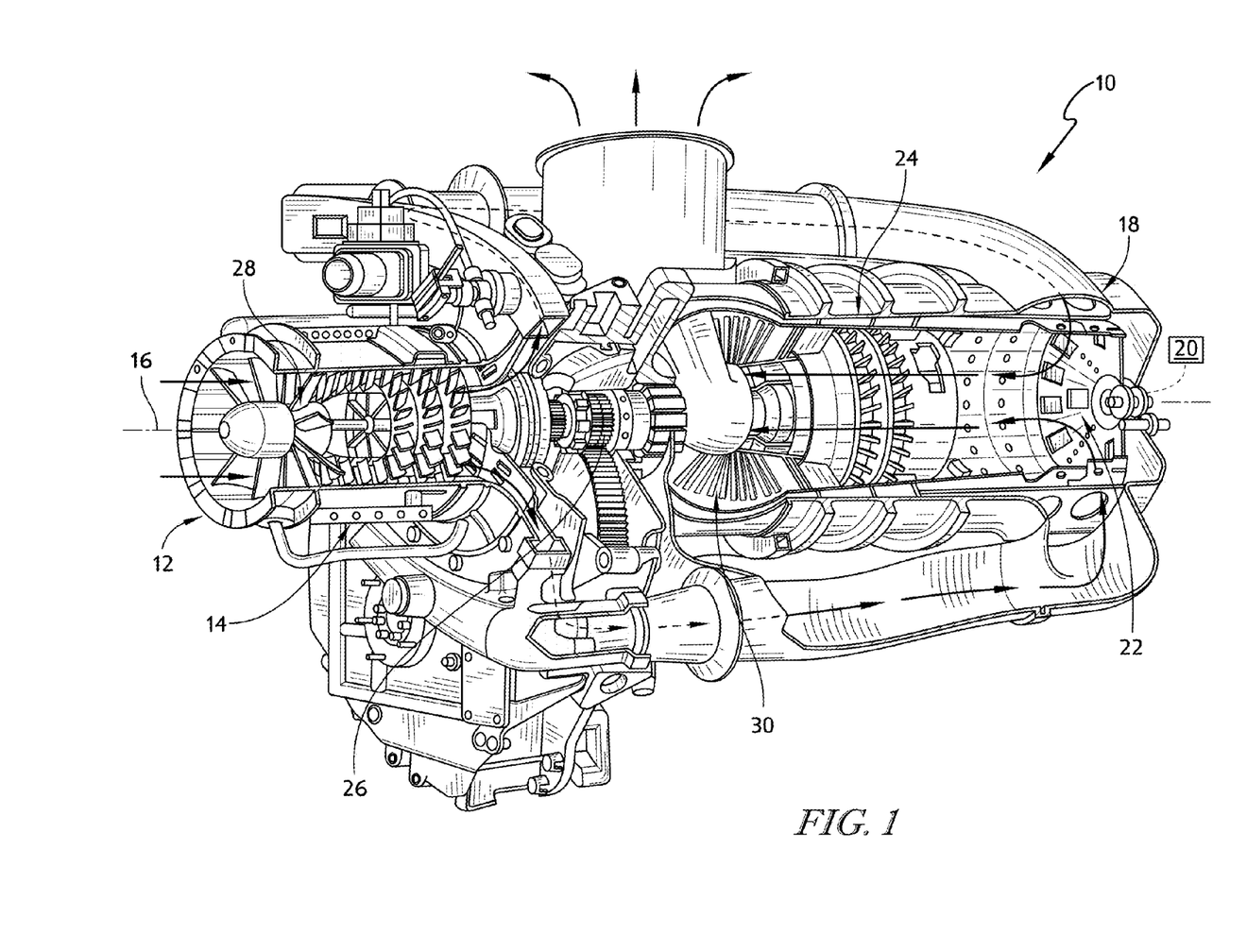
FIG. 1 is a perspective view of a turbine engine with a portion of the turbine engine cut away to reveal a fluid plenum according to one form of the disclosure and also showing part of a fluid flow path in the turbine engine.

One embodiment of the disclosure enhances the flow of exhaust gases from a turbine engine and may be applied in a reverse flow turbine engine. FIG. 1 shows a reverse flow turbine engine 10. The various unnumbered arrows and dash lines represent the flow of fluid through the turbine engine 10. The turbine engine 10 can produce power for several different kinds of applications, including vehicle propulsion and power generation, among other applications.

The exemplary turbine engine 10 can include an inlet 12 to receive a fluid such as, for example, air. In some embodiments, the turbine engine 10 can include a fan (not shown) to direct the fluid into the inlet 12. The turbine engine 10 can also include a compressor section 14 structured and positioned to receive the fluid from the inlet 12 and compress the fluid. The compressor section 14 can be spaced from the inlet 12 along a centerline axis 16 of the turbine engine 10. The turbine engine 10 can also include a combustor section 18 to receive the compressed fluid from the compressor section 14. The compressed fluid can be mixed with fuel from a fuel system 20 (shown schematically) and ignited in an annular combustion chamber 22 defined by the combustor section 18. The turbine engine 10 can also include a turbine section 24 structured and positioned to receive the combustion gases from the combustor section 18. The energy associated with the combustion gases can be converted into kinetic energy (motion) in the turbine section 24. A shaft 26 is disposed for rotation about the centerline axis 16 of the turbine engine 10. Although the turbine engine 10 is shown as having a single shaft 26, it should be understood that the turbine engine 10 can have any number of shafts. The shaft 26 couples the compressor section 14 with the turbine section 24. The turbine section 24 is driven in rotation by combustion gases exiting the combustion chamber 22, and this rotation is operably transmitted to the compressor section 14. The compressor section 14 includes a plurality of rotatable compressor blades 28 that compress fluid entering the compressor section 14 through the inlet 12. The compressor section 14 can define a single-stage compressor a multi-stage compressor. A "stage" of the compressor section 14 can be defined as a group of blades aligned along the axis 16 and spaced circumferentially from one another about the axis 16. It should be understood that the compressor section 14 can define any number of stages.

In one embodiment of the disclosure, the fluid plenum 30 is disposed in the turbine engine 10 and is configured and positioned to collect exhaust gases downstream of the turbine section 24. As used herein, the term "plenum" will be understood generally to indicate a passage through which a fluid, such as an exhaust fluid, will pass. At least two engineering challenges arise in the collection of exhaust gases from a reverse-flow turbine engine such as the turbine engine 10. First, the axial space in the turbine engine in which to turn the fluid stream from the aft end of the turbine section 24 and out of the turbine engine 10 is limited, which can in turn lead to inherently high pressure losses. This can at least partially be due to the presence of a large cylinder to accommodate the engine shaft protruding through the center of the diffuser (which will be discussed further below), and/or the small turning radii in the fluid flow stream associated with traditional designs which can lead to a high degree of flow separation and back flow. Second, given that the engine configuration generally dictates that the exhaust exit be on one side of the engine, a preferential flow location (that closest to the exit) is created. This has significant implications on the circumferential back pressure distribution imposed on the turbine section. This "maldistribution" of flow and pressure at the aft end of the turbine section has the effect of reducing turbine performance.

Figure 2:
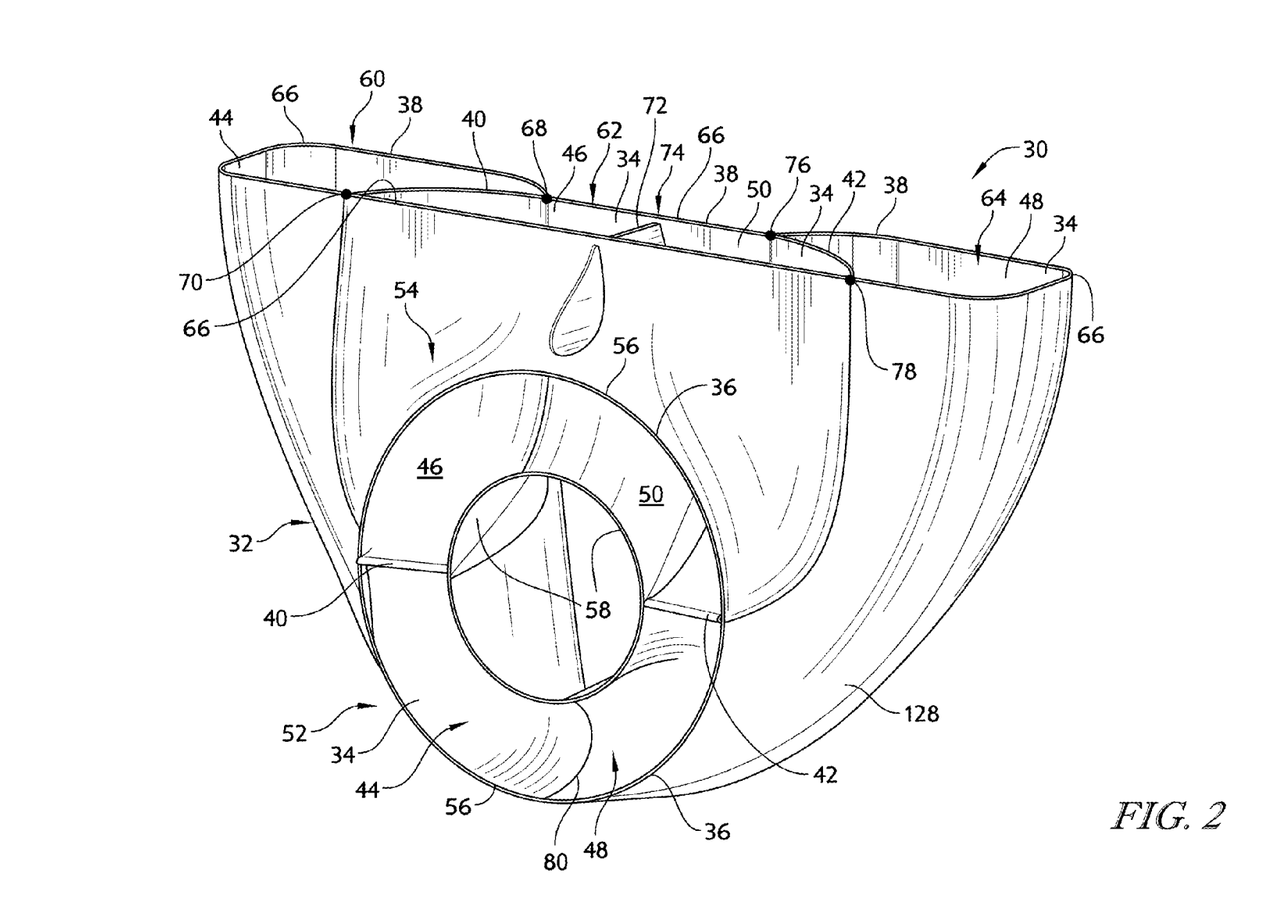
FIG. 2 is a perspective view of the fluid plenum removed from the turbine engine.

As shown in FIG. 1, the exemplary fluid plenum 30 is positioned between the compressor section 14 and the turbine section 24 along the common centerline axis 16 and surrounds the shaft 26. Referring to FIG. 2, the fluid plenum 30 generally includes a body 32 defining an internal cavity 34. The fluid plenum 30 also includes an inlet 36 to the internal cavity 34 through the body 32, and an outlet 38 from the internal cavity 34 through the body 32, with the outlet 38 spaced from the inlet 36. A fluid stream of combustion gases from the turbine section 24 (FIG. 1) can pass into the body 32 via the inlet 36, through the body 32, and out of the body 32 via the outlet 38. The fluid plenum 30 further includes at least one wall disposed in the internal cavity 34. The exemplary fluid plenum 30 includes a plurality of walls 40 and 42. The wall 40 divides the internal cavity 34 into first and second passageways 44 and 46, and the wall 42 divides the internal cavity 34 into third and fourth passageways 48 and 50. A third wall 72 is positioned in the internal cavity 34 to partially separate the passageways 46 and 50 from one another. The exemplary first, second, third, and fourth passageways 44, 46, 48, 50 at least partially overlap one another along the centerline axis 16.

In the exemplary embodiment of the fluid plenum 30, the walls 40 and 42 divide the inlet 36 into multiple inlet portions. In the illustrated embodiment, the inlet 36 is ring-shaped and is divided into multiple inlet portions. In one embodiment, the inlet 36 includes a first inlet portion 52 bounded by an outer diameter 56 of the inlet 36, an inner diameter 58 of the inlet 36, the wall 40 and the wall 42. The inlet 36 also includes a second inlet portion 54, also bounded by the outer diameter 56, the inner diameter 58, the wall 40 and the wall 42. Each of the exemplary first and second inlet portions 52, 54 are adjacent to one another and occupy substantially one-half of the inlet 36. The entire second inlet portion 54 is closer to the outlet 38 than the first inlet portion 52 relative to the flow of fluid through the body 32. Additionally, the walls 40 and 42 divide the first and second inlet portions 52, 54 from one another and are generally coplanar to one another at the inlet 36. The plane along which the walls 40 and 42 extend at the inlet 36 also contains the centerline axis 16. The outlet 38 is offset to one side of this plane (i.e., on the same side as the second inlet portion 54), and the first inlet portion 52 is offset on the other side of this plane opposite the outlet 38. In one embodiment, the body 32 and/or the walls 40, 42, 72 are formed as a single piece. However, in other embodiments, the body 32 and/or the walls 40, 42, 72 are formed from multiple pieces that are integrated or joined together to form the fluid plenum 30.

In the exemplary embodiment of the fluid plenum 30, the walls 40, 42 and 72 divide the outlet 38 into multiple outlet portions. In the illustrated embodiment, the walls 40, 42 and 72 divide the outlet 38 into first, second, third and fourth outlet portions 60, 62, 64 and 74 positioned adjacent one another. The first outlet portion 60 is bounded by an outer edge 66 of the outlet 38 and the wall 40. The wall 40 intersects the outer edge 66 at points 68 and 70. The second outlet portion 62 is also bounded by the outer edge 66 and the wall 40, with the wall 72 substantially intersecting the outer edge 66 and also at least partially bounding the second outlet portion 62. The third outlet portion 64 is bounded by the outer edge 66 and the wall 42, with the wall 42 intersects the outer edge 66 at points 76 and 78. The fourth outlet portion 74 is also bounded by the outer edge 66 and the wall 42, with the wall 72 substantially intersecting the outer edge 66 and also at least partially bounding the fourth outlet portion 74.

In the exemplary embodiment of the fluid plenum 30, the first and second inlet portions 52, 54 are coplanar with one another, and the first, second, third, and fourth outlet portions 60, 62, 64, 74 are likewise coplanar with one another. In the illustrated embodiment, the inlet 36 is substantially fully defined in a first plane normal to the centerline axis 16, and the outlet 38 is substantially fully defined in a second plane. If the wall 72 extended to the outer edge 66, the outlet 38 would be fully defined in the second plane. In the illustrated embodiment, the first and second planes are arranged transverse to one another, with the inlet 36 generally aligned along the centerline axis 16 and the outlet 38 directed radially outward relative to the centerline axis 16.

In the exemplary embodiment of the fluid plenum 30, the first passageway 44 is configured and positioned to receive fluid through the first inlet portion 52 and to direct fluid to the first outlet portion 60, the second passageway 46 is configured and positioned to receive fluid through the second inlet portion 54 and to direct fluid to the second outlet portion 62, the third passageway 48 is configured and positioned to receive fluid through the first inlet portion 52 and to direct fluid to the third outlet portion 64, and the fourth passageway 50 is configured and positioned to receive fluid through the second inlet portion 54 and to direct fluid to the fourth outlet portion 74.

In the exemplary embodiment of the fluid plenum 30, the first and second passageways 44, 46 extend along first and second lengths, and with the first and second lengths of the passageways 44, 46 being different from one another. Similarly, the third and fourth passageways 48, 50 extend along third and fourth lengths, and with the third and fourth lengths of the passageways 48, 50 likewise being different from one another. The length of a particular passageway can be defined by a straight path or a non-straight path. By way of example, the paths that define the lengths of the passageways 44, 46, 48 and 50 are non-straight. Additionally, the path that defines the length of a passageway can be formed from numerous individual points. Each point along the path can be a center point for the area of the passageway at each location along the path. The area at any particular location along the path can be defined in a plane that is normal to the direction of fluid flow. Also, the area can be bounded fully by the body 32 or can be bounded partially by the body 32 and partially by the at least one wall.

Figure 6:
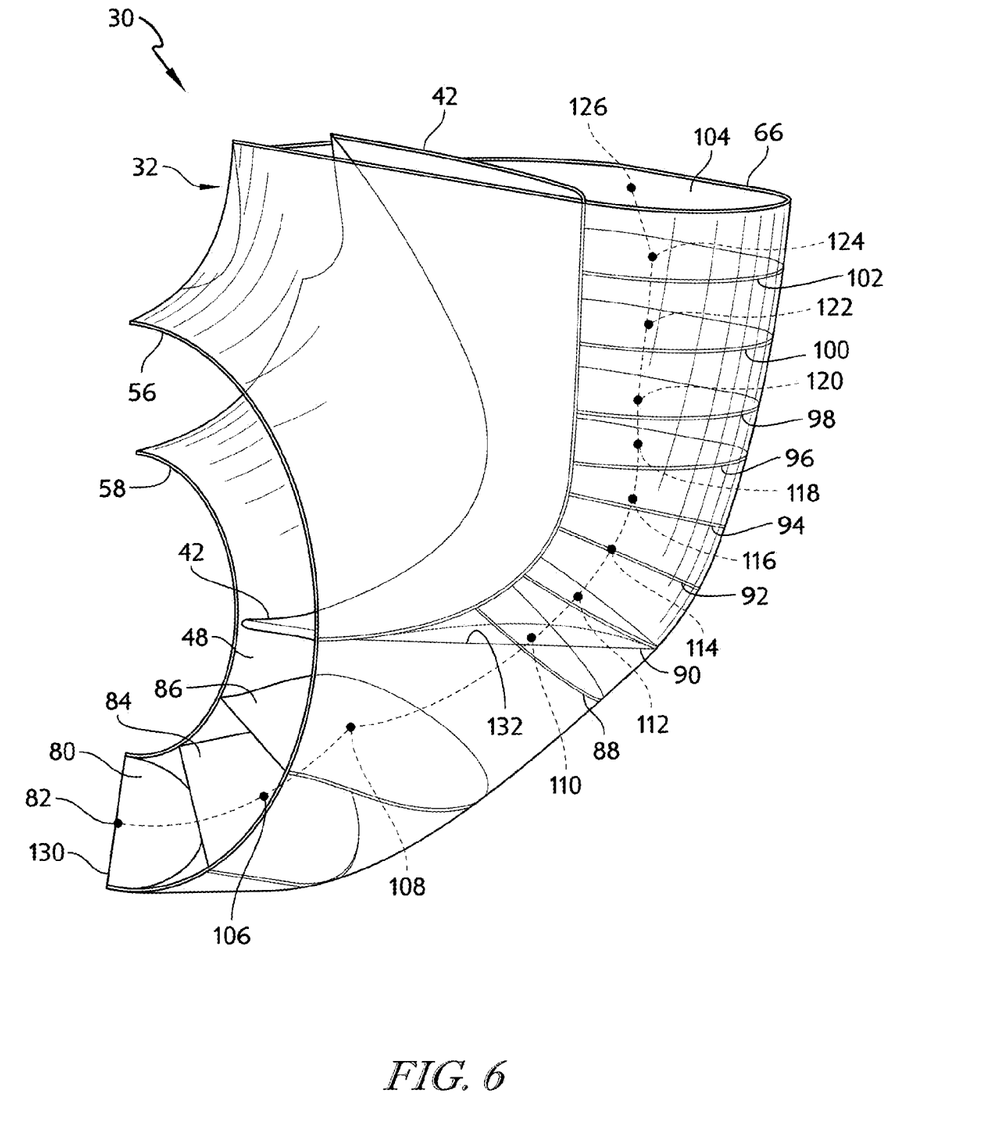
FIG. 6 is a perspective view of a portion of the fluid plenum showing various planes defined along a length of a fluid passageway.

Referring to FIG. 6, shown therein is a perspective view of a portion of the exemplary fluid plenum 30 illustrating various cross-sectional areas defined along a length of the third passageway 48. In FIG. 6, the left-half of the fluid plenum 30 (relative to FIG. 2) has been removed. Several discrete planar cross-sectional areas are shown in solid lines, in dashed lines, or in a combination of solid and dashed lines. These cross-sectional areas are defined in the third passageway 48. An exemplary cross-sectional area 80 is disposed at bottom dead center (also referenced in FIG. 2). The center point of the cross-sectional area 80 is referenced at 82. Additional cross-sectional areas 84, 86, 88, 90, 92, 94, 96, 98, 100, 102 and 104 are also illustrated in FIG. 6, along with associated center points referenced at 106, 108, 110, 112, 114, 116, 118, 120, 122, 124 and 126. The dashed line connecting the center points referenced at 106, 108, 110, 112, 114, 116, 118, 120, 122, 124 and 126 is the path of fluid flow, and the distance between center points 82 and 126 is the overall length of the path. Generally, the cross-sectional areas 80, 84, 86, 88, 90, 92, 94, 96, 98, 100, 102 and 104 are arranged normal to fluid flow through the third passageway 48, although variations in the direction of flow can occur, especially at the inlet 36 and/or the outlet 38. For example, between bottom dead center and the wall 42, fluid enters the third passageway 48 and flow will be less than perfectly normal to cross-sectional areas such as cross-sectional area 80.

In the exemplary embodiment of the fluid plenum 30, the first and third fluid passageways 44, 48 are substantially similar in length and are relatively longer than the second and fourth passageways 46, 50, which are likewise substantially similar in length. However, it should be understood that the various passageways 44, 46, 48 and 50 are operable to generate a substantially common back-pressure at the first and second inlet portions 52, 54 during flow of a fluid stream into the inlet 36 of the body 32. A first sub-stream of the fluid stream of combustion gases exiting the turbine section 24 (shown in FIG. 1) can enter the first inlet portion 52 and pass through the first passageway 44 to the first outlet portion 60. A second sub-stream of the fluid stream of combustion gases can enter the second inlet portion 54 and pass through the second passageway 46 to the second outlet portion 62. A third sub-stream of the fluid stream of combustion gases can enter the first inlet portion 52 and pass through the third passageway 48 to the third outlet portion 64. A fourth sub-stream of the fluid stream of combustion gases can enter the second inlet portion 54 and pass through the fourth passageway 50 to the fourth outlet portion 74. The back pressures about the entire inlet 36 can be more harmonized (i.e., be substantially the same) by appropriately shaping the body 32 and/or one or more of the walls.

In the exemplary embodiment of the fluid plenum 30, the first and third passageways 44, 48 are configured/positioned/fashioned to minimize the back-pressure at the inlet 36. Conversely, the second and fourth passageways 46, 50 are configured/positioned/fashioned to generate greater than minimum back-pressure at the inlet 36. In other words, the exemplary second and fourth passageways 46, 50 generate back-pressure at the inlet 36 that would otherwise be greater than a minimum back-pressure possible based on the lengths of the second passageway 46 and the fourth passageway 50. The second and fourth passageways 46 and 50 could be designed differently, thereby resulting in a lower back pressure at the second inlet portion 54 than at the first inlet portion 52.

Figure 3:
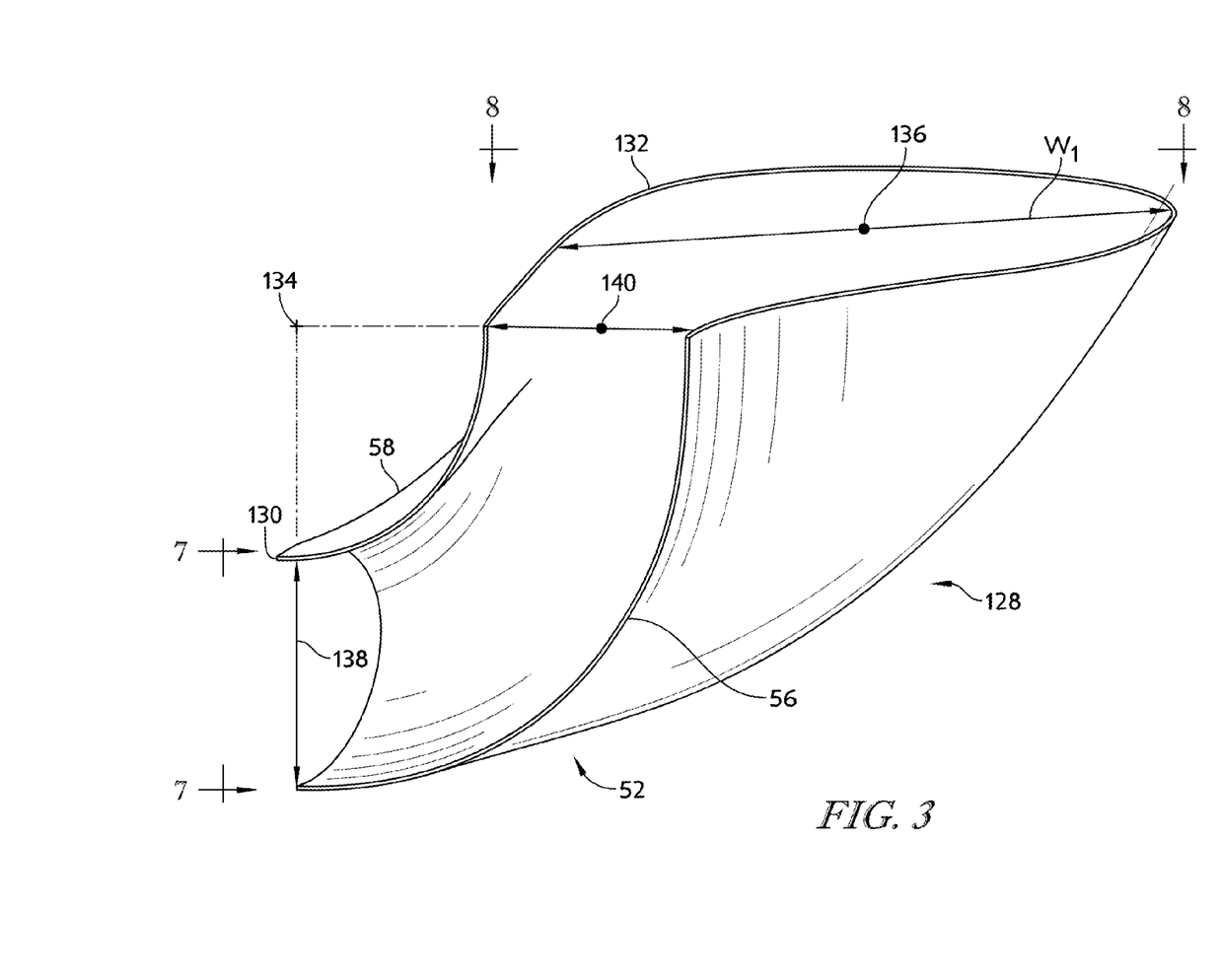
FIG. 3 is a perspective view of a scroll portion of the fluid plenum.
Figure 7:
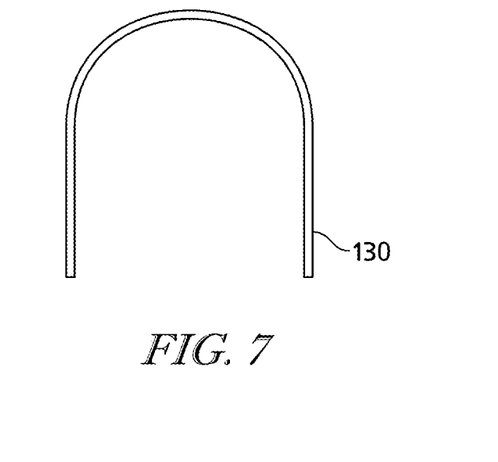
FIG. 7 is an end view of the scroll portion illustrated in FIG. 3, as viewed along line 7-7 of FIG. 3.
Figure 8:
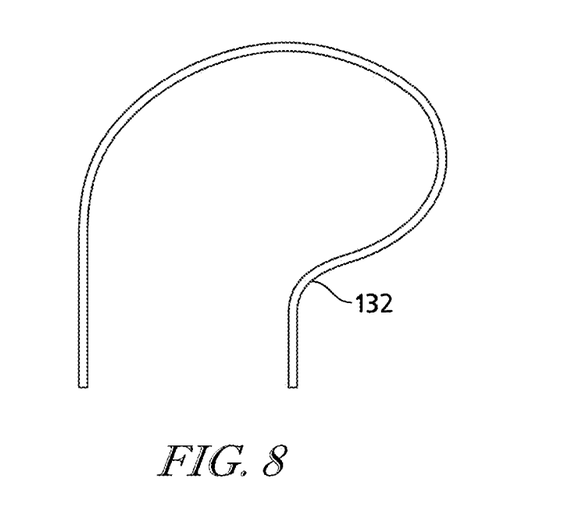
FIG. 8 is an end view of the scroll portion illustrated in FIG. 3, as viewed along line 8-8 of FIG. 3.

In the exemplary embodiment of the fluid plenum 30, it should be appreciated that the first and third passageways 44, 48 are mirror images of one another across a vertical plane containing the centerline axis 16. It is noted that the exemplary inner and outer diameters 58, 56 are centered on the centerline axis 16. The third passageway 48 will be described in detail, it being understood that the description is also applicable to the first passageway 44. In the illustrated embodiment, the third passageway 48 includes an initial portion that is formed as a scroll. Generally, a scroll is a spiral or convoluted structure derived from curved walls. Referring to FIG. 3, shown therein is a scroll portion 128 of the third passageway 48 isolated perspective view. As should be appreciated, the cross-sectional area of the scroll changes as the scroll extends about an axis. Referring to FIG. 7, shown therein is a section view of the scroll portion 128 at an initial cross-section at bottom dead center. As should be appreciated, this shape corresponds to the shape of the cross-section area 80 shown in FIG. 6. As should also be appreciated, a first edge 130 of the scroll portion 128 mates with a corresponding edge of the scroll portion defining the first passageway 44 (i.e., a mirror image of the scroll portion 128). Referring to FIG. 8, shown therein is a section view of the scroll portion 128 at a final cross-section. As should be appreciated, the edge 132 of the scroll portion 128 mates with the next portion of the third passageway 48 (discussed below).

The dimensions of the scroll portion 128 can be derived by applying the methodology set forth in Frolov, V. V. and Golubtsov, V. M., 1972, "Designing Vaneless Nozzle Units for Axial Turbine Stages," Thermal Engineering, 19, No. 9, September, pp. 83-86, which is hereby incorporated by reference in its entirety. The equation that can be applied to determine the chief dimensions of the scroll is:

$$F_0 = 2\pi R_0 \ell_1 e^{\tan\alpha_1} \left[ \frac{1 - \frac{k-1}{k+1}\lambda_{1t}^2}{1 - \frac{k-1}{k+2}\left(\frac{D_{av}\cos\alpha_1}{2R_0}\lambda_{1t}\right)^2} \right]^{\frac{k}{k-1}}$$

$$\left[ \frac{1 - \frac{k-1}{k+1}\varphi_0^2\left(\frac{D_{av}\cos\alpha_1}{2R_0}\lambda_{1t}\right)^2}{1 - \frac{k-1}{k+1}\varphi_1^2\lambda_{1t}^2} \right] \left[\frac{\varphi_1}{\varphi_2}\right]$$

$F_0$ represents the cross-sectional area of the inlet to the scroll portion 128. In the exemplary embodiment, $F_0$ is one-half of the area of the first inlet portion 52 shown in FIG. 2.

$R_0$ represents a distance from the center of the inlet cross-sectional area ($F_0$) to a center point of the outlet of the scroll portion 128. In FIG. 3, the point referenced at 134 is in the same plane as the first inlet portion 52 and is the center of the inlet cross-sectional area ($F_0$). The inner and outer diameters 58, 56 are centered on the point 134. The point referenced at 136 is the center point of the outlet of the scroll portion 128. Points 134 and 136 are coplanar, but point 136 is not coplanar with the first inlet portion 52. $R_0$ is the distance between points 134 and 136.

$l_1$ represents the height of the scroll portion 128. The height of the scroll portion 128 is referenced by a double arrow in FIG. 3 at 138.

α1 represents the flow angle at the outlet 38 of the fluid plenum 30.

k is the gas constant, $C_P$ divided by $C_V$.

$\lambda_{1t}$ represents a dimensionless value for the velocity of the fluid stream passing out of the outlet of the scroll portion 128.

$D_{av}$ represents the center-to-center diameter of inlet of the scroll. In the exemplary embodiment, $D_{av}$ is the distance between points 134 and 140, doubled (i.e., the distance between points 134 and 140 multiplied by two). Point 140 is coplanar with point 134 and with the first inlet portion 52.

$\phi_0$ represents the ratio of actual velocity to ideal velocity at the inlet 36 of the fluid plenum 30.

$\phi_1$ represents the ratio of actual velocity to ideal velocity at the outlet 38 of the fluid plenum 30.

When the Frolov/Golubtsov equation is applied, various parameters can be held constant while one or more other parameters are varied in order to concurrently conform the scroll portion 128 to the operating environment, while also minimizing the back pressure induced at the first inlet portion 52.

Figure 4:
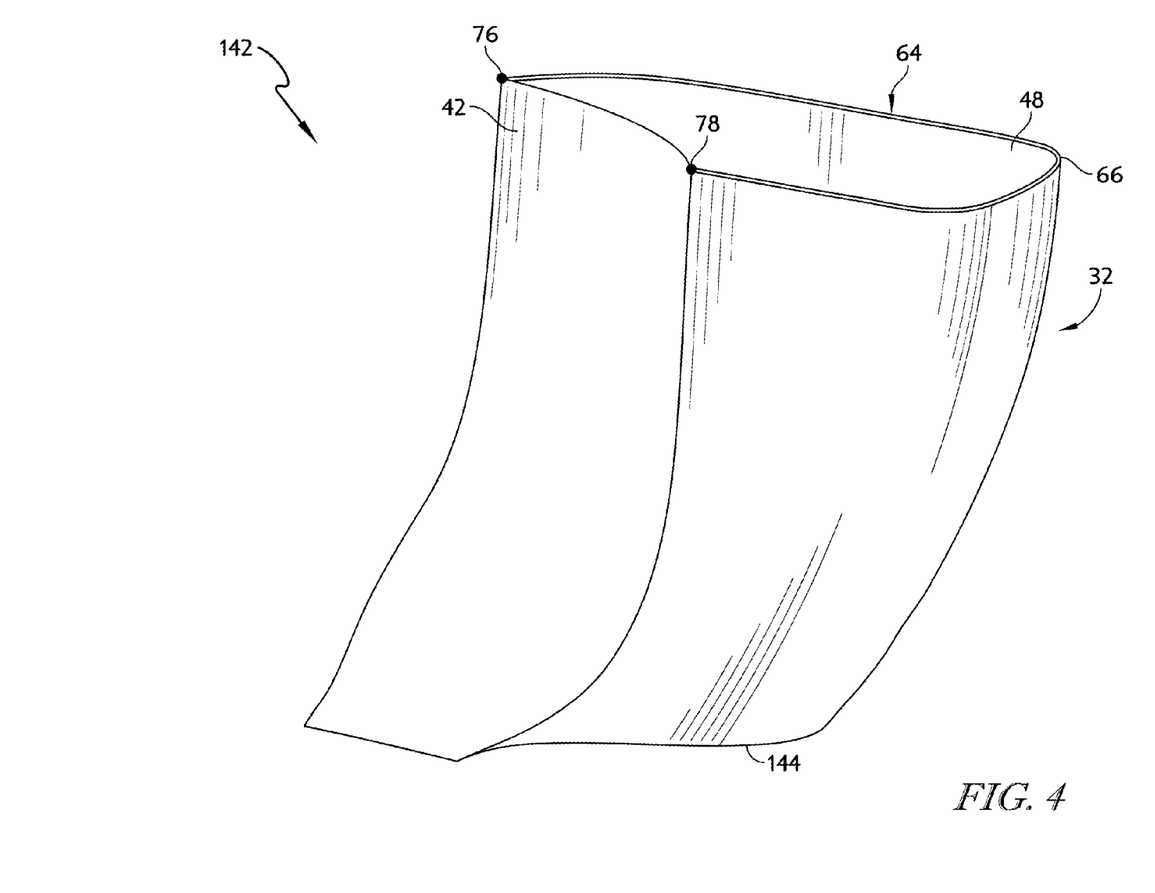
FIG. 4 is a perspective view of a diffuser portion of the fluid plenum.

The scroll portion 128 ends relative to the flow of fluid at the edge 132 and interconnects with a diffuser 142, as illustrated in FIG. 4. A bottom edge 144 of the diffuser 142 contacts the edge 132 of the scroll portion 128 in a sealing manner to continuously extend the third passageway 48. The exemplary diffuser 142 is formed, in part, by the body 32 and is closed from the fourth passageway 50 by the wall 42. The diffuser 142 is generally straight and can be designed based on the space available in the turbine engine 10 and also in view of the methodology set forth by D. S. Miller in "Internal Flow Systems," first published by BHR Group Limited in 1976, which is also incorporated by reference.

Figure 9:
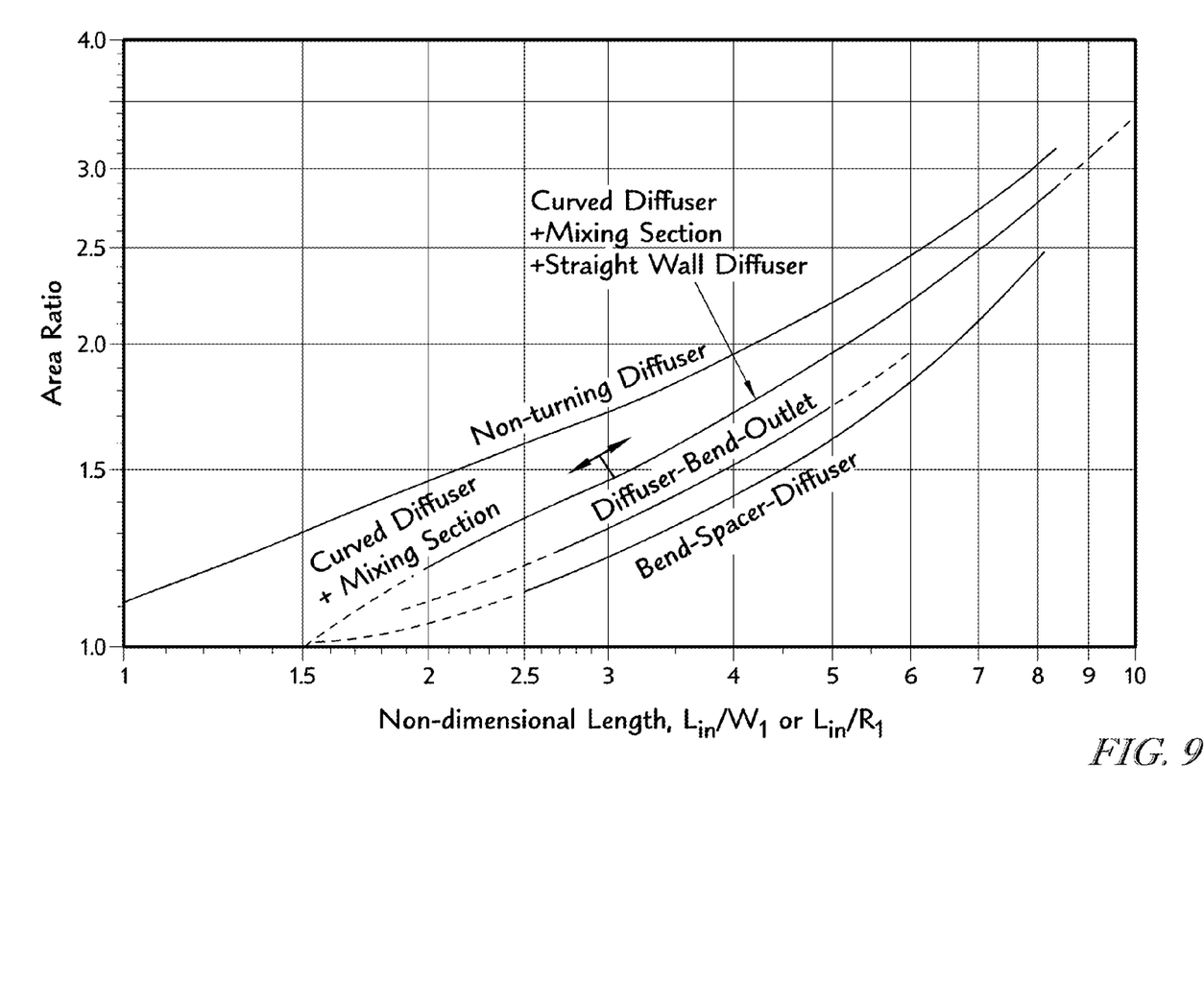
FIG. 9 is graph relating the dimensions of a diffuser that can be applied in various embodiments of the disclosure.

The Miller publication provides the chart set forth in FIG. 9 where the vertical axis is associated with the area ratio, which is the ratio of the outlet area at the third outlet portion 64 to the area of the third passageway 48 at the intersection of the diffuser 142 and the scroll portion 128. The horizontal axis in the graph of FIG. 9 is associated with a non-dimensional value $L_{in}/W_1$ or $L_{in}/R_1$, where $L_{in}$ is the length of the diffuser 142. The length of the diffuser 142 is defined along the path explained above and as illustrated in FIG. 6. The length of the diffuser 142 constitutes a portion of the overall length of the third passageway 48. $W_1$ and $R_1$ are dimensions associated with the cross-sectional area of the third passageway, with $W_1$ being used when the cross-sectional area of the diffuser 142 is non-circular and $R_1$ being used when the cross-sectional area of the diffuser 142 is non-circular. As explained by Miller, $R_1$ is the inlet radius of circular diffusers. In the illustrated embodiment, the diffuser 142 is non-circular, and $W_1$ is a dimension that increases along the length of the diffuser 142 from the inlet to the outlet and is representative of the increasing cross-sectional area of the diffuser 142. This dimension $W_1$ progressively and gently increases as the diffuser 142 extends from the inlet (i.e., at the junction with the scroll portion 128) to the outlet (i.e., the third outlet portion 64). In the exemplary embodiment, the value $W_1$ at the inlet of the diffuser 142 can be used for the determining the non-dimensional value $L_{in}$.

It should be appreciated that the chart of FIG. 9 can be applied iteratively to select the desired dimensions of the diffuser 142, or can be applied when one or more of the dimensions are constrained (predetermined) by the geometry of the turbine engine 10. For example, if it is decided that the area ratio will be 2.0 and that a long, straight diffuser will be used, non-dimensional value of $L_{in}/W_1$ or $L_{in}/R_1$ should be around 4.33. The value 4.33 will dictate $L_{in}$ if $W_1$ or $R_1$ is constrained.

Figure 5:
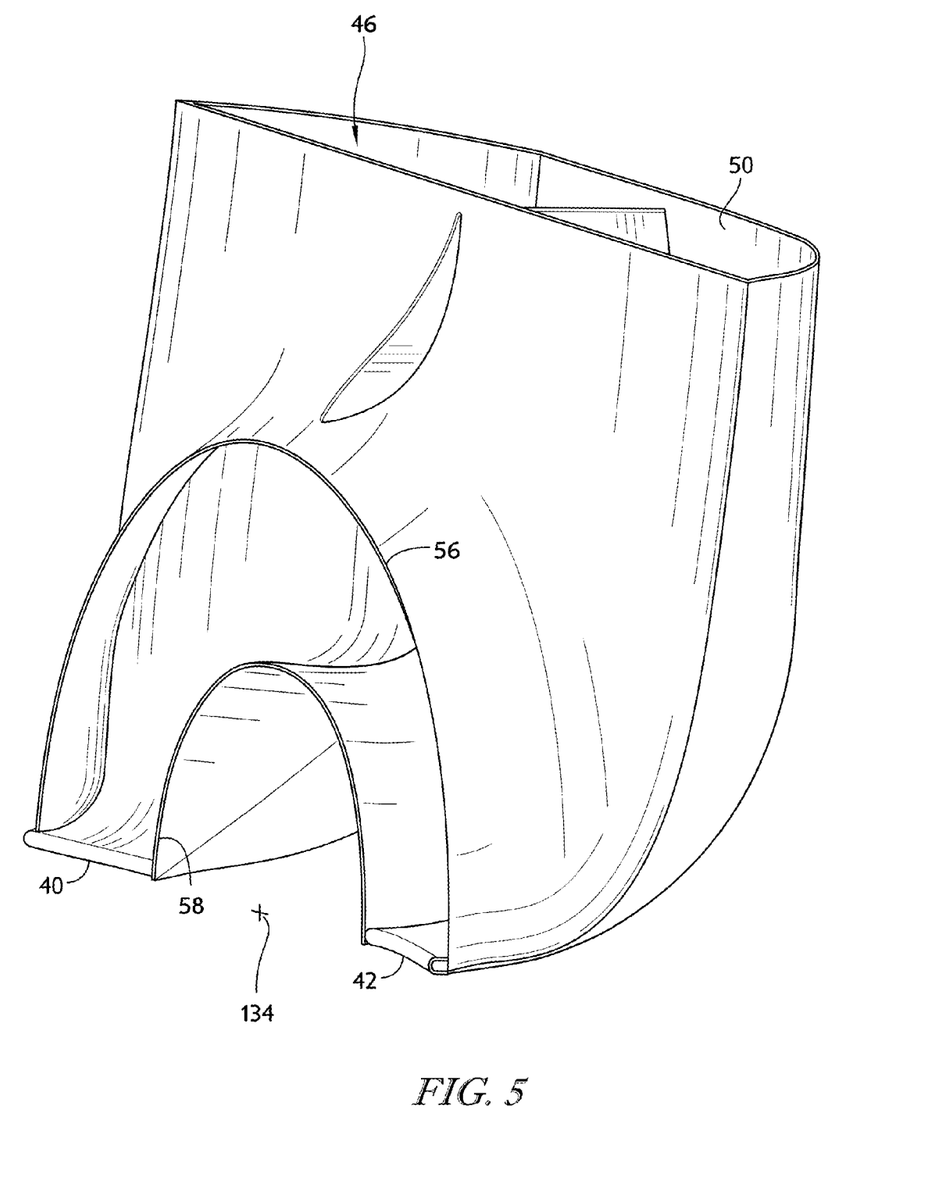
FIG. 5 is a perspective view of a bent diffuser portion of the fluid plenum.

Referring now to FIG. 5, in one embodiment, the second and fourth passageways 46, 50 are constructed as a bent diffuser. The exemplary diffuser structure illustrated in FIG. 5 forms two bent diffusers, one each for the exemplary second and fourth passageways 46, 50. As set forth above, the fluid plenum 30 is formed such that the back pressure about the inlet 36 is substantially similar, with each of the first and third passageways 44, 48 designed to minimize back pressure at the inlet 36. Each of the second and fourth passageways 46, 50 can be designed not to minimize back pressure, but to match the back pressure generated by the optimized first and the third passageways 44, 46.

Figure 10:
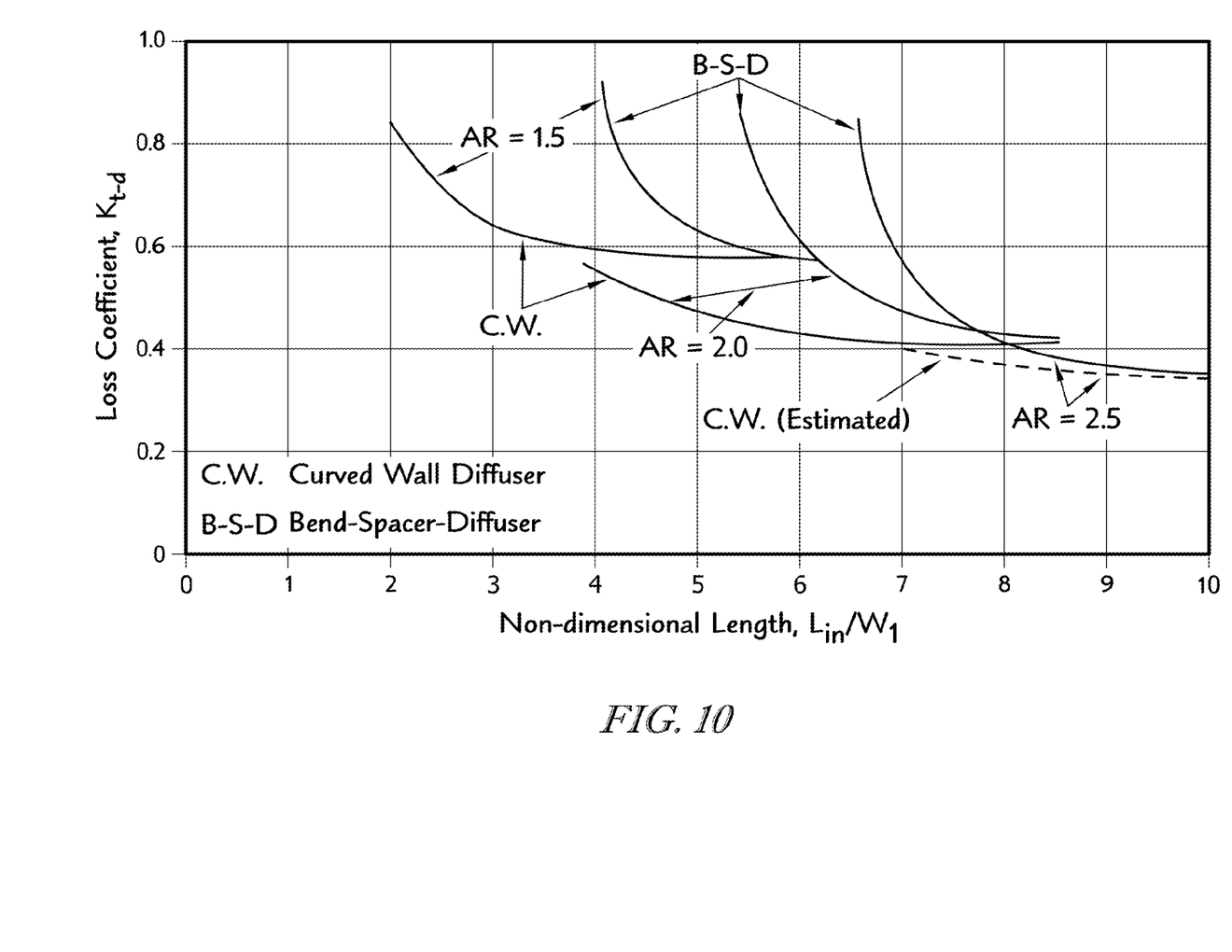
FIG. 10 is graph relating the dimensions of a bent diffuser that can be applied in various embodiments of the disclosure.

The Miller publication also provides a methodology for designing the bent diffuser design used to form for the exemplary second and fourth passageways 46, 50. FIG. 10 is a graph that may be used in designing the bent diffusers. The vertical axis in the graph of FIG. 10 is associated with the loss coefficient, which is the same as the loss coefficient generated by the first or third passageway 44, 48. The loss coefficient generated by the first or third passageway 44, 48 can be determined by testing of sample parts, by computational fluid dynamic computer programs, or by other suitable design methods or techniques. The horizontal axis in the graph of FIG. 10 is associated with a non-dimensional value $L_{in}/W_1$, where $L_{in}$ is the length of the bent diffuser. The length of the bent diffuser can be defined in the same manner that the length of the third passageway 48 was determined (see above). $W_1$ is a dimension that increases along the length of the bent diffuser from inlet to outlet and is representative of the increasing cross-sectional area of the bent diffuser. In the exemplary embodiment, $W_1$ is the radial distance between the inner diameter 58 and the outer diameter 56 relative to the point 134. Applying the graph of FIG. 10 to the exemplary embodiment, the curve associated with "B" for bent diffuser or bend and also associated with the appropriate area ratio (AR in the graph, ratio of the second outlet portion area 62 to one-half of the area of the second inlet portion 54) can be selected to determine a desirable non-dimensional length $L_{in}/W_1$.

It is noted that the equations and graphs illustrated and applied above can be applied in an iterative process to determine final dimensions of the various structures. Certain initial values can be assumed to derive other values. Further, the geometry of the turbine engine 10 may narrow the range of possible starting values for at least some of the values, thus focusing the starting point of the iterative process.

Verification of the improvements provide by the exemplary embodiment of the disclosure was carried out through back-to-back experimental testing of this exemplary embodiment and two other currently-known designs. The main metrics for performance evaluation were normalized total-static pressure loss at a corrected flow rate and circumferential normalized static pressure asymmetry evaluated at the turbine exit hub. Normalized total-static pressure loss is calculated as:

$$\Delta P_n = \frac{P_{T_{in}} - P_{S_{out}}}{P_{T_{in}}}$$

$\Delta P_n$ is the normalized total-static pressure loss. $P_{T_{in}}$ is the mass-averaged stagnation pressure at the exhaust collector inlet. $P_{S_{out}}$ is the static pressure at the exhaust collector exit. $P_{S_{out}}$ was considered to be identically ambient pressure in the test cell as no evacuation devices were employed during testing and no obstructions were present in the near-field of the exhaust collector exit. The corrected flow rate can be written as:

$$W_{corrected} = \frac{W\sqrt{\Theta}}{d}$$

W is the mass flow rate.

$\Theta = T_{T_{in}}/T_{std}$

T is temperature. $T_{T_{in}}$ is the total inlet temperature. $T_{std}$ is the standard day sea level static temperature.

$d = P_{T_{in}}/P_{std}$

P is pressure. $P_{T_{in}}$ is the total inlet pressure. $P_{std}$ is the standard day sea level static pressure.

A circumferential map of static pressure at the turbine exit was obtained using a static pressure probe which could be rotated 360 degrees inside of the exhaust collector. Normalized static pressure was calculated as:

$$P_{S,norm} = \frac{P_{S_i}}{\overline{P_S}},$$

$P_{S_i}$ is the measured static pressure at the turbine exit and $\overline{P_S}$ is the mass-averaged static pressure at the turbine exit.

Figure 11:
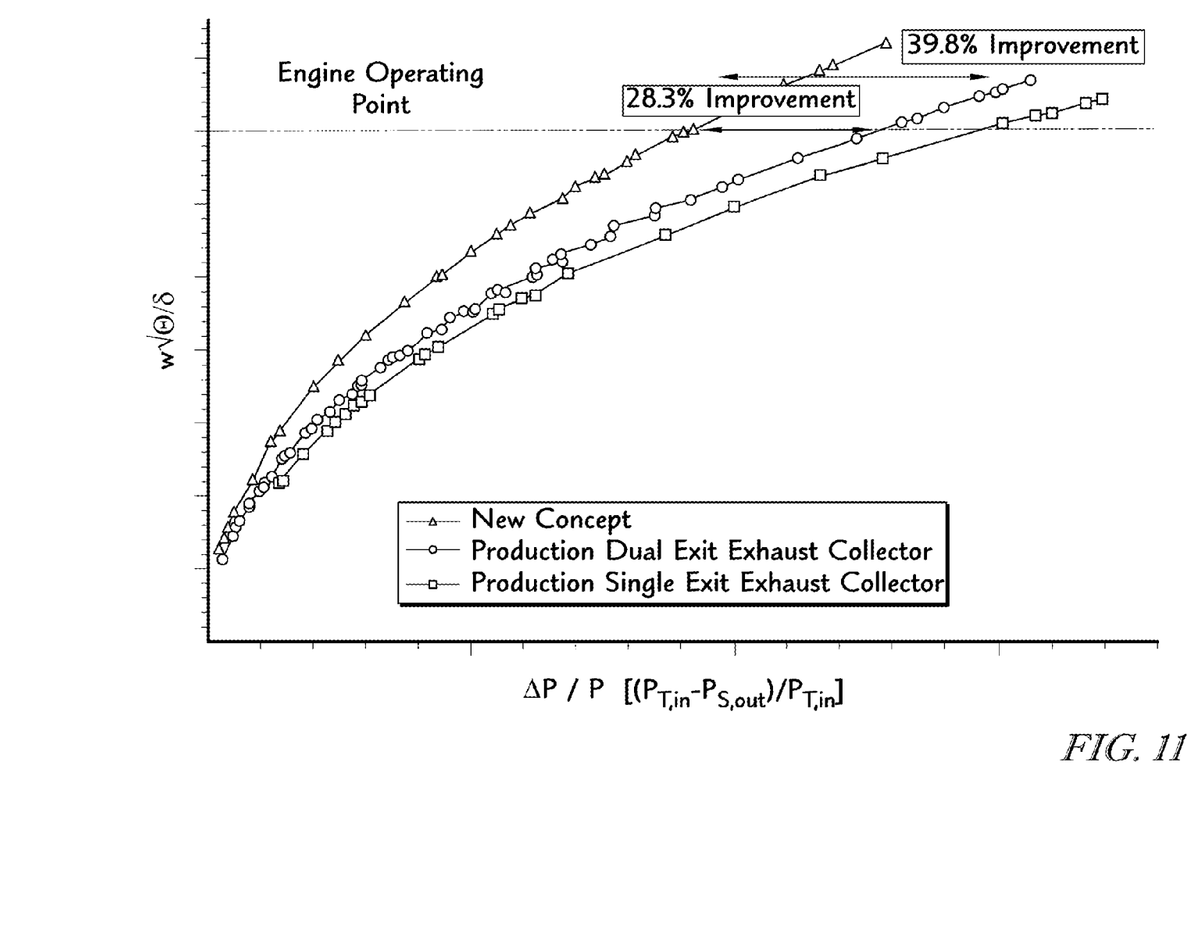
FIG. 11 is a graph depicting a direct comparison of flow characteristics (corrected flow rate vs. normalized pressure loss) for an exemplary embodiment of the disclosure relative to two production exhaust collectors with similar geometric constraints.

Referring to FIG. 11, illustrated therein is a direct comparison of flow characteristics (corrected flow rate versus normalized pressure loss) for the exemplary embodiment of the fluid plenum 30 and two current production exhaust collectors with similar geometric constraints (i.e., constraints arising from the configuration of the turbine engine 10). As should be appreciated, the exemplary embodiment of the fluid plenum 30 reduces total pressure loss by 28.3% and 39.8% compared to the production dual exit exhaust collector and the production single exit exhaust collector, respectively.

Figure 12:
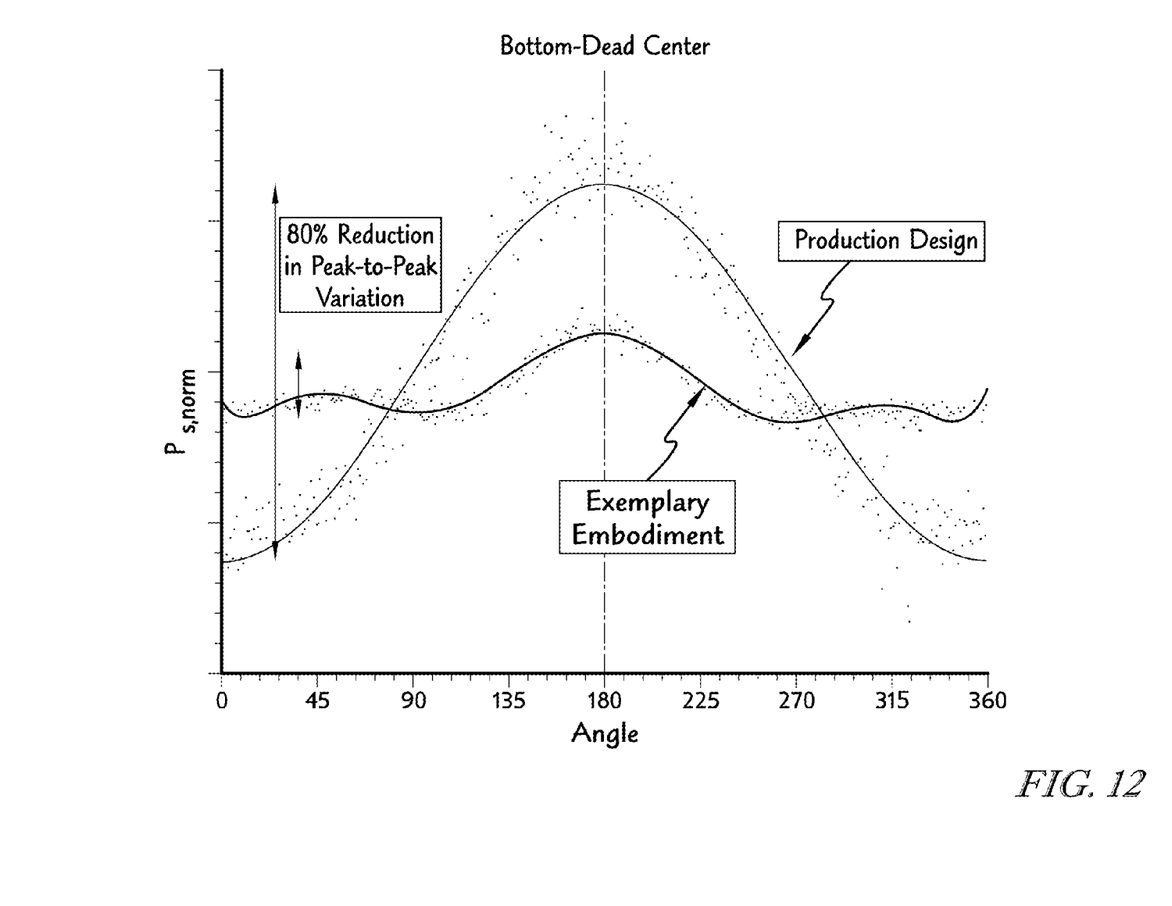
FIG. 12 is a graph depicting the measured back-pressure asymmetry induced by an exemplary embodiment of the disclosure relative to a current production design with similar geometric constraints at identical mass flow rates.

Referring to FIG. 12, illustrated therein is the measured back-pressure asymmetry induced by the exemplary embodiment of the fluid plenum 30 and a tested current production design with similar geometric constraints at identical mass flow rates. A reduction in peak-to-peak variation in static pressure at the collector inlet/turbine exit of 80% is observed and remained fundamentally constant with variations in mass flow rate. Note that spurious oscillations in the tails of data for the exemplary embodiment illustrated in the graph of FIG. 12 are caused by the curve fitting algorithm and are not intended to convey trends in the data. The angle of the horizontal axis corresponds to various angular positions of the inlet of the fluid plenum or exhaust collector about the centerline axis 16.

It is noted, by way of example, that an embodiment of the disclosure could be used successfully in the following applications: (1) annular entrance-to-side exit diffuser arrangements like those found in reverse-flow engine architectures, (2) annular entrance-to-side exit diffuser applications, (3) annular entrance-to-side exit nozzle applications, (4) side inlet-to-annular exit diffuser applications, and (5) side inlet-to-annular exit nozzle applications.

While the invention has been described with reference to an exemplary embodiment, it will be understood by those skilled in the art that various changes may be made and equivalents may be substituted for elements thereof without departing from the scope of the disclosure. It is noted that half of the exemplary embodiment, such as the first and second passageways 44, 46 without the third and fourth passageways 48, 50, could itself constitute an embodiment.

Additionally, various changes and modifications to the described embodiments described herein will be apparent to those skilled in the art, and such changes and modifications can be made without departing from the spirit and scope of the disclosure and without diminishing its intended advantages. Moreover, while the disclosure has been illustrated and described in detail in the drawings and foregoing description, the same is to be considered illustrative and not restrictive in character, it being understood that only selected embodiments have been shown and described and that all changes, equivalents, and modifications that come within the scope of the disclosures described herein or defined by the following claims are desired to be protected.

What is claimed is:

1. A turbine engine, comprising:
   a compressor section structured to compress a fluid;
   a combustor section disposed downstream of said compressor section to receive compressed fluid from said compressor section and to contain the compressed fluid and fuel during combustion;
   a turbine section disposed downstream of said combustor section to receive combustion gases from said combustor section and to convert energy associated with the combustion gases to rotary power at least in part for said compressor section, and wherein said turbine section and said compressor section are rotatable about a common axis; and
   a fluid plenum disposed downstream of said turbine section and including:
      a body defining an internal cavity;
      an inlet to said internal cavity through said body, said inlet receiving a fluid stream of combustion gases from said turbine section;
      an outlet from said internal cavity through said body, said outlet spaced from said inlet, said outlet directed radially outward relative to said common axis;
      at least one wall disposed in said internal cavity, said at least one wall dividing said internal cavity into at least first and second passageways, said at least one wall dividing said inlet into at least first and second inlet portions positioned adjacent one another and dividing said outlet into at least first and second outlet portions positioned adjacent one another;
      said first passageway structured to receive fluid through said first inlet portion and to direct fluid to said first outlet portion;
      said second passageway structured to receive fluid through said second inlet portion and to direct fluid to said second outlet portion, wherein said first and second passageways extend along first and second lengths, said first and second lengths being different from one another;
   wherein said first and second passageways are operable to generate a substantially common back-pressure at said first and second inlet portions during flow of a fluid stream through said inlet, including a first sub-stream of the fluid stream through said first passageway and a second sub-stream of the fluid stream through said second passageway, and
   wherein said fluid plenum is positioned between said compressor section and said turbine section along said common axis.

2. The turbine engine of claim 1, further comprising:
   a shaft interconnecting said compressor section and said turbine section for transmitting rotary power, and wherein said fluid plenum surrounds said shaft.

3. The turbine engine of claim 1, wherein said inlet is ring-shaped and is defined by an inner diameter and an outer diameter, said at least one wall dividing said first and second inlet portions from one another along a plane containing said common axis, and said outlet being disposed on one side of said plane.

4. The turbine engine of claim 3, wherein said first inlet portion is disposed on an opposite side of said plane relative to said outlet, said first fluid passageway extending from said first inlet portion as a scroll and downstream of said first inlet portion transitions to a substantially straight long diffuser ending at said first outlet portion.

5. The turbine engine of claim 4, wherein said second fluid passageway extends from said second inlet portion and defines a bent diffuser.

6. The turbine engine of claim 5, wherein said first and second passageways overlap one another along said common axis.

7. A turbine engine comprising:
   a compressor section including components mounted for rotation about an axis;
   a combustor section fluidly coupled to and disposed downstream of the compressor section;
   a turbine section fluidly coupled to and disposed downstream of the combustor section, the turbine section including components mounted for rotation about the axis; and
   a fluid plenum disposed between the compressor section and the turbine section along the axis, the fluid plenum including (i) a body defining an internal cavity, (ii) an inlet to the internal cavity through the body arranged to receive gases from the turbine section, (iii) an outlet from the internal cavity arranged to direct gasses discharged from the internal cavity outward relative to the common axis, and (iv) at least one wall disposed in the internal cavity,
   wherein the at least one wall is shaped to divide the internal cavity into at least first and second passageways that extend from the inlet to the outlet and that have different lengths, to divide the inlet into at least first and second inlet portions positioned adjacent one another, and to divide the outlet into at least first and second outlet portions positioned adjacent one another.

8. The turbine engine of claim 7, further comprising a shaft interconnecting the compressor section and the turbine section for transmitting rotary power, and wherein the fluid plenum surrounds the shaft.

9. The turbine engine of claim 7, wherein the inlet is ring-shaped and is defined by an inner diameter and an outer diameter, the at least one wall dividing the first and second inlet portions from one another along a plane containing the common axis, and the outlet being disposed on one side of the plane.

10. The turbine engine of claim 9, wherein the first inlet portion is disposed on an opposite side of the plane relative to the outlet, the first fluid passageway extending from the first inlet portion as a scroll and downstream of the first inlet portion transitions to a substantially straight long diffuser ending at the first outlet portion.

11. The turbine engine of claim 10, wherein the second fluid passageway extends from the second inlet portion and defines a bent diffuser.

12. The turbine engine of claim 11, wherein the first and second passageways overlap one another along the common axis.

13. The turbine engine of claim 7, wherein the fluid plenum is shaped to generate a substantially common back-pressure at the first and second inlet portions during operation of the turbine engine.

\* \* \* \* \*